United States Patent Office 2,895,679
Patented July 21, 1959

2,895,679

METHODS OF DISPERSING FOGS

George Alfred Hugh Elton, London, England, assignor of one-half to Leda Chemicals Limited, London, England, a British company No Drawing. Application April 30, 1954
Serial No. 426,924

Claims priority, application Great Britain May 4, 1953

13 Claims. (Cl. 239—2)

This invention relates to methods of dispersing fogs.

Most fogs consist of liquid droplets whose diameters vary from 1 to 100 microns and may be of the order of ten microns. These droplets are often formed by condensation of water vapour on a solid nucleus, such as a smoke particle. The droplets may also contain varying amounts of electrolytes in solution, depending on atmospheric conditions, and the surfaces of the droplets generally take up a charge. This charge varies with the type of ion adsorbed, because different types of ions are adsorbed to different extents (depending on the magnitudes of their adsorption energies). Droplets of pure water dispersed in air carry a negative surface charge of about 30 e.s.u. per square cm., and although it is possible that other ions will also be adsorbed, the droplets in most fogs will have a negative charge unless some of the other ions have a large positive charge or are strongly adsorbed. When two such droplets in a fog approach close to one another, they will repel one another, the extent of repulsion depending on the magnitude of the surface charges. This repulsion tends to prevent collision and coalescence.

Broadly according to the present invention there is provided a method of dispersing fog, wherein a surface-active agent is introduced in the fog in such manner and in such proportions as to promote the coalescence of the droplets of the fog and their precipitation as rain or drizzle.

This coalescence may be promoted by removing or lowering the surface charge on the droplets of the fog. As the droplets grow by coalescence, their velocity of sedimentation under gravity increases, and eventually the liquid water content of the fog is precipitated as rain or drizzle. The same effect can be produced by introducing into the fog oppositely charged droplets which, at close distances of approach, attract the fog droplets.

The surface charge may be removed or lowered by introducing a surface-active agent, as a smoke, into the fog droplets. The surface-active agent should be a non-ionic one or, preferably, an ionic material having a charge opposite to that of the fog droplets. When coalescence is to be caused by attraction of fog droplets to oppositely charged droplets containing surface-active agent, the latter may be introduced into the fog in the form of a spray.

Negatively charged fog droplets are the most common in occurrence and cationic surface-active agents such as tetraisoamylammonium chloride, lauryl or stearyl dimethyl benzylammonium chloride or cetyl pyridinium chloride may be used to disperse a fog composed of such droplets. If analysis of the fog droplets shows that already, under atmospheric conditions, they contain appreciable amounts of surface active or multivalent cations, and hence have a positive surface charge precipitation can be brought about by surface active anions, e.g. sodium salts of long-chain alkyl sulphates or sulphonates.

For a better understanding of the invention, the two ways of introducing a surface-active agent into a fog will now be described in greater detail.

THE SMOKE METHOD

The smoke may be formed in various ways, e.g. a spray of a dilute solution of a surface-active agent in a volatile solvent may be introduced into a stream of hot air, which volatilises the solvent, and produces a smoke. Smoke particles captured by liquid fog droplets, dissolve, and cause a lowering of the droplet surface charge by adsorption. If an excess of ionic smoke is used, it is possible by this method to produce reversal of the charge, and hence restabilisation of the fog. It is therefore necessary when treating a fog to be able to assess the magnitude of the surface charge. For an uncontaminated water fog, the charge is −30 e.s.u. per cm.$^2$. This can be removed by tetraisoamylammonium chloride at a concentration of about $1-3 \times 10^{-7}$ N (see Gilman and Bach, Acta Physicochimica U.R.S.S. 1938, 9, 27). With a contaminated fog, the charge on the droplets may be determined by collecting a sample of the fog water and observing the rate of cataphoresis of an air bubble in the liquid. Experience with fogs of various types enables a reasonable estimate to be made of the probable magnitude of the surface charge. The amounts of surface-active agent necessary to remove this charge can then be determined from a calibration chart; e.g. the calculated amounts of tetraisoamylammonium chloride necessary to neutralise the charge of various types of fog droplets are given in the table.

Table

| Type of fog | Mountain fog | Sea fog | Contaminated industrial fog |
|---|---|---|---|
| Charge, e.s.u./cm.$^2$ | ca. −50 | −100 to −200 | ca. −1,000 |
| Normality of cation-active agent required | $5 \times 10^{-7}$ | $5 \times 10^{-6}$ | $10^{-4}$ |

Once it has been decided what concentration of ionic surface-active agent is necessary, an appropriate amount of smoke is dispersed into the fog, depending on the amount of liquid water per unit volume of the fog, which can be determined by standard methods. For example, if it is required to treat a contaminated fog of surface charge −1000 e.s.u./cm.$^2$, and the liquid water content of the air is $3 \times 10^{-7}$ gm./cc., then $1 \times 10^5$ cubic metres (i.e. $1 \times 10^{11}$ cc.) contains $3 \times 10^4$ gm. of water (30 litres). In order to bring the concentration to $10^{-4}$ N it is required to have $30 \times 10^{-4}$ gm. equivalents of lauryl dimethyl benzylammonium chloride (equivalent weight 340), that is about 1 gm. is required in $1 \times 10^5$ cubic metres. If the height to which the fog is dispersed is 100 metres, this requires the release of 1 gm. of smoke per thousand square metres or 1 kg. per square kilometre.

Non-ionic surface-active agents (e.g. pentaerythritol esters, polyoxyethylene compounds) can lower the surface charge, not by a neutralization process (as is the case with the ionic agents), but by displacement of ions from the surface. That is, if sufficient non-ionic agent is added to a fog droplet to produce a complete, or nearly complete, absorbed film of the agent in the surface, the charge-forming ions are displaced. Fairly large amounts of such compounds are required for this (say ca $10^{-3}$ N to be certain, but non-ionic compounds have the advantage for use in the smoke method that "overdosing" is not possible). For dealing with light fogs, or for use in conditions where the composition and water content of the fog is unknown or subject to sudden change, the use of non-ionic compounds may be the most satisfactory.

THE SPRAY METHOD

An ionic surface-active agent can be used in a spray of water droplets which are introduced in the fog by means of a machine of high spraying rate (e.g. of the type used to spray insecticides on a large scale). In this method sufficient surface-active agent is added to the sprayed liquid to give the drops an opposite charge to those in the fog, and hence collision is promoted by attraction. Furthermore, fairly large drops can be sprayed, if necessary many times larger than the fog droplets. This has the advantage that the hydrodynamic collision efficiency is larger for large droplets than for small droplets (Langmuir, J. Meteorology, 1948, 5, 175). That is, even if there are no charges on the dropets, not all of the expected collisions actually occur, as interaction of the hydrodynamic flow lines associated with the droplets causes repulsion. For fog droplets of given size, the hydrodynamic collision efficiency increases with increasing radius of the spray droplet, up to a spray droplet radius of about 1000 microns.

As a spray droplet of radius $R$ settles, it tends to collect fog droplets whose centres are at distance less than $(R+r)$ from the centre of the spray droplet. The minimum "area of influence" of the spray droplet, neglecting any attractive forces between spray and fog droplets, is therefore $\pi(R+r)^2$, the effective area swept is $E\pi(R+r)$. If $R=10^{-2}$ cm., and $r=10^{-3}$ cm., for which $E=0.660$, then the effective area swept per drop is $0.660\ \pi\ (1.1\times10^{-2})^2$ sq. cm.$=2.51\times10^{-4}$ sq. cm. Hence to sweep effectively an area of 1 sq. km. ($10^{10}$ sq. cm.) $10^{10}/2.51\times10^{-4}=4\times10^{13}$ drops are required. Since each spray drop weighs $(4/3\pi R^3\rho_2=4.2\times10^{-6}$ gm., the weight required is $4\times10^{13}\times4.2\times10^{-6}$ gm.$=1.7\times10^5$ kg. For a $10^{-4}$ N solution of lauryl dimethyl benzylammonium chloride (equivalent weight 340) this requires $1.7\times10^5\times340\times10^{-4}$ gm.$=5.7$ kg.

Spraying machines of the type at present used for spreading insecticides over large areas can be used directly or in modified form. Those which employ a hot-air blast to assist dissemination of the sprayed material are useful in cases where the spray droplets must travel to a considerable height, though with this type of spraying machine, allowance has to be made for evaporation of the spray droplets. An important point is that the spray produced must not contain appreciable proportions by weight of small droplets, which would themselves diminish visibility.

The spray method will disperse fog more rapidly than the smoke method for the following reasons:

(*a*) A certain time is necessary for the smoke to diffuse through the fog, dissolve in the drops, and come to equilibrium.

(*b*) The smoke method relies on collisions between the fog droplets themselves to initiate precipitation. Since these are small, the initial coagulation rate will be low, but the rate increases as larger droplets are formed, which settle more rapidly through the fog, collecting other droplets as they go.

With the smoke method, it is necessary to distribute a fairly definite amount of material into the fog, while in the spray method, use of an excess of spray is not detrimental. However, the apparatus required for the smoke method is less complicated and expensive. With the spray method the transporting of large droplets to a height of a few hundred feet is difficult, although spraying from helicopters or other aircraft, or from the top of buildings can help to overcome this problem.

For laboratory tests of the method of the invention, fogs may be prepared as follows:

A stream of air is drawn through a filter to remove stray nuclei, and passed as a stream of fine bubbles through a generator containing water maintained at 50–60° C. The resultant stream of air and water vapour is passed into a chamber maintained at 80–90° C. (the reheater), and there mixed with smoke nuclei obtained as described below. The mixture of nuclei and vapour issuing from the reheater is divided into two portions, and drawn through two identical fog chambers formed by 10-litre flasks. When the rate of flow is correctly adjusted, a fog is formed in the flasks. These are interconnected by a separate tube to ensure that conditions of pressure, etc., are the same in each flask. One of the fogs can then be used as a control, while the other is treated in any desired way.

The smoke nuclei used are silver iodide, calcium chloride or magnesium perchlorate. An acetone solution of silver iodide can be atomised in a spray-type atomiser, using a stream of coal gas, and the issuing mixture of coal gas and solution burnt (using a small flame about 1–2 cm. long). The smoke is passed into the reheater through a glass chimney.

With a given amount of water vapour, a fog which is optically denser (i.e. is of smaller droplet size) can be obtained by using hygroscopic nuclei (viz. calcium chloride or magnesium perchlorate). There is no great difference between the fogs obtained with the two types of hygroscopic nuclei.

A fog prepared as above from pure water, especially on (insoluble) silver iodide nuclei is not very stable. There is a tendency to settle out, and small amounts of volatile electrolytes, e.g. ammonia, sulphur dioxide, hydrogen sulphide and hydrogen chloride are added to stabilise the fog. Ammonia is the most effective probably due to the strong adsorption of the hydroxyl ion to give a high negative charge which tends to prevent the growth of the particles by collision. As general practice, the water in the vapour generator contains small amounts of ammonium hydroxide, and fogs of various stability times may be obtained at will.

Fogs were prepared by the method described above in a chamber formed by a vertical tube of height 15 cms. and diameter 4 cms. The smoke nuclei were silver iodide, and the fogs were stabilised by addition of definite amounts of ammonia. The tube was suitably illuminated and the velocity of sedimentation of the fogs under gravity was observed, measurements being made on about 50 fogs (minimum droplet radius about 10 microns). The velocity of sedimentation of these stabilised fogs was found to be constant during the time of test (up to 8 seconds), indicating that the drop size was constant.

Similar tests were made using identical fogs to which had been added smokes of one of the cationic-active agents cetyl pyridinium chloride, lauryl dimethylbenzylammonium chloride, and stearyl dimethyl benzylammonium chloride. For each surface-active agent, measurements were made using about 50 fogs, and in each case it was found that the sedimentation velocities increased quite rapidly with time, indicating growth of the particles by collision. The results indicated that in a fog of water content about 10 grams per cubic metre, collisions occurred at an average rate of the order of 0.1 collisions per drop per second. The actual value depended on the surface-active agent used, the particle size distribution in the fog, and the amount of smoke added (this being very difficult to control, as the amounts needed were so small).

For the clearance of e.g. aircraft runways by the spray method, spraying machines are set out at suitable distances along the runways. Each spray requires a rotating head device and the fields of operation of the sprays are arranged to overlap so as to provide full coverage for the runway. Clearance is made of the runway parallel to, or at the smallest angle to, the wind.

For clearance of larger areas where fog is usually accompanied by wind (even at little as 0.5 m.p.h.) the sprays are set out round the perimeter of the area, and the sprays on the upwind side are operated, to provide a "curtain" through which the fog passes on its way into the area. This results in precipitation of the advancing fog at the upwind sprays, and a cleared area advances downwind over the area to be cleared. It is necessary for the "curtain" to be of such a height that uncleared fog above the range of the spray does not have time to descend below the required minimum height of clearance by the time it has reached the far side of the area to be cleared. For example, droplets of radius 10 microns sediment at a rate of 120 ft. per hour, in the absence of convection. Hence if an area one mile square is to be cleared to a minimum height of 100 ft., and the wind velocity is 1 m.p.h., the height of the spray curtain must be 220 ft. It is also desirable to operate some at least of the sprays along the side of the square to prevent sideways drift of fog into the cleared area.

For gradual clearance of larger areas, small smoke generators distributed over the area can be used to lower the charge and hasten precipitation. The rate of emission of the smoke into the area depends on the wind velocity, and the amount must be regulated according to the volume of fog liquid passing through the treated area per unit time, knowing the expected height of penetration of the smoke.

With either the smoke or spray method, periodical retreatment of the cleared area is generally necessary, as the cleared area generally "fills in" as fog descends from above by the ordinary sedimentation process (usual rate about 1 cm./sec. in the absence of convection), or as fog diffuses in horizontally. In the presence of wind, the whole cleared area moves downwind, and is replaced by more fog.

Whilst reference has been made above to a fog it is understood that this term is meant to include aerosols such as mists or clouds which contain droplets of water.

What I claim is:

1. A method of dispersing a fog of moisture droplets comprising forming surface charges on fog dispersing droplets, distributing the latter throughout said fog, and coalescing the moisture droplets into the interiors of the fog dispersing droplets while maintaining the surface charges on the latter which are thereby effective to coalesce a large number of said moisture droplets, the fog dispersing droplets being treated with a surface active agent to form said surface charges.

2. A method of dispersing a fog of moisture droplets having electrical surface charges of a particular sign comprising producing a state of electrical surface charge on fog dispersing droplets, which state is non-repellent with respect to surface charges of said particular sign, distributing said fog dispersing droplets throughout said fog, and coalescing the moisture droplets into the interiors of the fog dispersing droplets while maintaining said state of surface charge on the latter which are thereby effective to coalesce a large number of said moisture droplets, the fog dispersing droplets being associated with a surface active agent so as to produce said state of electrical surface charge.

3. A method of dispersing fog according to claim 1, wherein the surface-active agent is distributed in the fog in the form of a smoke consisting of finely divided particles of said agent, thereby to facilitate the adsorption of said agent by the fog droplets.

4. A method of dispersing fog according to claim 3, wherein the smoke particles are chosen to have an electrical charge opposite to that of the fog droplets.

5. A method of dispersing fog according to claim 4, wherein, in a given volume of the treated fog, the total electrical charge on the smoke particles is caused to be substantially equal to the total electrical charge on the fog droplets, whereby the electrical charge on the outside surface of the droplets is substantially neutralized.

6. A method of dispersing fog according to claim 1, wherein the surface-active agent is added to the fog as a dilute solution of said agent in a volatile solvent, whereby, on evaporation of the solvent, the surface-active agent is distributed in the fog in the form of finely-divided particles.

7. A method of dispersing fog according to claim 6, wherein said solution is distributed in the fog by means of a stream of warm air.

8. A method of dispersing fog according to claim 1, wherein the surface-active agent is added to water and distributed in the fog by spraying the water in the form of drops into the fog.

9. A method of dispersing fog according to claim 8, wherein said drops are given an electric charge opposite to that on the fog droplets by the choice of surface-active agent.

10. A method of dispersing fog according to claim 1, wherein the surface-active agent is tetraisoamylammonium chloride.

11. A method of dispersing fog according to claim 1, wherein the surface-active agent is lauryldimethylbenzylammoniumchloride.

12. A method of dispersing fog according to claim 1, wherein the surface-active agent is stearyldimethylbenzylammoniumchloride.

13. A method of dispersing fog according to claim 1, wherein the surface-active agent is cetylpyridiniumchloride.

References Cited in the file of this patent

UNITED STATES PATENTS

| | | |
|---|---|---|
| 1,512,783 | Miller | Oct. 21, 1924 |
| 1,928,963 | Chaffee | Oct. 3, 1933 |
| 2,052,626 | Houghton | Sept. 1, 1936 |
| 2,160,900 | Pleasants | June 6, 1939 |
| 2,232,728 | Pleasants | Feb. 25, 1941 |
| 2,507,030 | Lynch | May 9, 1950 |

OTHER REFERENCES

Chemical Reviews, vol. 44, pages 312, 313, and 314.
Cloud Physics, by Perris, page 48.
Rain Making and Other Weather Vagaries, by Humphreys, pages 75, 76 and 77.
On the Local Dissipation of Natural Fog, by Houghton and Radford, pages 16, 17 and 18.